United States Patent [19]
Gormish et al.

[11] Patent Number: 5,659,631
[45] Date of Patent: Aug. 19, 1997

[54] DATA COMPRESSION FOR INDEXED COLOR IMAGE DATA

[75] Inventors: Michael J. Gormish, Los Altos; Edward L. Schwartz, Sunnyvale, both of Calif.

[73] Assignees: Ricoh Company, Ltd., Tokyo, Japan; Ricoh Corporation, Menlo Park, Calif.

[21] Appl. No.: 391,679

[22] Filed: Feb. 21, 1995

[51] Int. Cl.$^6$ .................. G06K 9/00; H04N 1/40
[52] U.S. Cl. .............. 382/166; 382/233; 382/237; 382/245; 358/4.55
[58] Field of Search .................. 382/166, 232, 382/237, 242, 244, 245, 196, 168, 169, 171, 270, 233; 348/391, 392, 393, 394, 395; 345/155, 153, 187; 358/426, 455; 395/114, 115; 364/724.01

[56] References Cited

U.S. PATENT DOCUMENTS

| | | | |
|---|---|---|---|
| 4,868,773 | 9/1989 | Coyle et al. | 364/724.01 |
| 4,943,937 | 7/1990 | Kasano et al. | 364/521 |
| 5,381,145 | 1/1995 | Allen et al. | 341/107 |
| 5,463,702 | 10/1995 | Trueblood | 382/239 |
| 5,471,207 | 11/1995 | Zandi et al. | 341/107 |
| 5,471,320 | 11/1995 | Jodoin et al. | 358/455 |

FOREIGN PATENT DOCUMENTS

3804175C2  2/1990  Germany .

OTHER PUBLICATIONS

Anil K. Jain, "Fundamentals of Digital Image Processing," Prentice–Hall Interntational, Inc., (1989), pp. 476–561. (ISBN 0–13–332578–4).

*Primary Examiner*—Leo Boudreau
*Assistant Examiner*—Wenpeng Chen
*Attorney, Agent, or Firm*—Philip H. Albert; Townsend and Townsend and Crew LLP

[57] ABSTRACT

A data compression system separates input data into color planes prior to compression. If needed for legacy game consoles, compression is performed by a game cartridge transparent to the console. To minimize the number of passes required of a coder/decoder, color planes are ordered by density and the densest color plane is coded first. After the first color plane is coded, other color planes are coded, but pixels which are known to have colors from previously coded color planes are not coded. The last color plane is not coded, but is deduced from all the other color planes. Alternatively, pixel color values are represented by vectors with components thereof separately coded by subcolor planes. Also, each color plane can be coded until a threshold number of pixels are coded, and the remaining pixels coded by bit plane. The image data could be coded using pixel position information as context.

26 Claims, 11 Drawing Sheets

| P00 | P01 | P02 |
|---|---|---|
| P10 | P11 | P12 |
| P20 | P21 | P22 |

(A)

| 7 | 3 | 12 |
|---|---|---|
| 7 | 7 | 12 |
| 4 | 7 | 7 |

(B)

Color Plane 7

| 1 | 0 | 0 |
|---|---|---|
| 1 | 1 | 0 |
| 0 | 1 | 1 |

Color Plane 12

| -- | 0 | 1 |
|---|---|---|
| -- | -- | 1 |
| 0 | -- | -- |

Color Plane 3

| -- | 1 | -- |
|---|---|---|
| -- | -- | -- |
| 0 | -- | -- |

| Time | Pixel Value | | | | | | | | | |
|---|---|---|---|---|---|---|---|---|---|---|
| | 2 | 0 | 5 | 1 | 8 | 15 | 7 | 2 | 1 | 0 |
| 0 | 0:0 | | | | | | | | | |
| 1 | 1:1 | 0:0 ✓ | | | | | | | | |
| 2 | 2:2 ✓ | 1:idle | 0:0 | | | | | | | |
| 3 | 3:idle | 2:idle | 1:1 | 0:0 | | | | | | |
| 4 | | 3:idle | 2:2 | 1:1 ✓ | 0:0 | | | | | |
| 5 | | | 3:3 | 2:idle | 1:1 | 0:0 | | | | |
| 6 | | | 0:4 | 3:idle | 2:2 | 1:1 | | | | |
| 7 | | | 1:5 ✓ | 0:idle | 3:3 | 2:2 | | | | |
| 8 | | | | 3:idle | 2:idle | 1:idle | 0:0 | | | |
| 9 | | | | | 3:idle | 2:idle | 1:1 | 0:0 | | |
| 10 | | | | | 0:4 | 3:3 | 2:2 | 1:1 | | |
| 11 | | | | | 1:5 | 0:4 | 3:3 | 2:2 ✓ | | |
| 12 | | | | | 2:6 | 1:5 | 0:4 | 3:idle | | |
| 13 | | | | | 3:7 | 2:6 | 1:5 | 0:idle | | |
| 14 | | | | | 0:8 ✓ | 3:7 | 2:6 | 1:idle | | |
| 15 | | | | | | 3:idle | 2:idle | 1:idle | 0:0 | |
| 16 | | | | | | 0:8 | 3:7 | 2:idle | 1:1 ✓ | |
| 17 | | | | | | 1:9 | 0:idle | 3:idle | 2:idle | |
| 18 | | | | | | 2:10 | 1:idle | 0:idle | 3:idle | |
| 19 | | | | | | 3:11 | 2:idle | 1:idle | 0:idle | |
| 20 | | | | | | 0:12 | 3:idle | 2:idle | 1:idle | |
| 21 | | | | | | 1:13 | 0:idle | 3:idle | 2:idle | |
| 22 | | | | | | 2:14 ✓ | 1:idle | 3:idle | 0:idle | |
| 23 | | | | | | | 3:idle | 2:idle | 1:idle | 0:0 ✓ |

Fig. 10

|      | Pixel Value | | | | | | | | | |
| --- | --- | --- | --- | --- | --- | --- | --- | --- | --- | --- |
| Time | 2 | 0 | 5 | 1 | 8 | 15 | 7 | 2 | 1 | 0 |
| 0 | 0:0 | | | | | | | | | |
| 1 | 1:1 | 0:0 ✓ | | | | | | | | |
| 2 | 2:2 ✓ | 1:idle | 0:0 | | | | | | | |
| 3 | 3:idle | 2:idle | 1:1 | 0:0 | | | | | | |
| 4 | | 3:idle | 2:2 | 1:1 ✓ | 0:0 | | | | | |
| 5 | | | 3:3 | 2:idle | 1:1 | | | | | |
| 6 | | | 0:4 | 3:idle | 2:2 | | | | | |
| 7 | | | 1:5 ✓ | 0:idle | 3:3 | | | | | |
| 8 | | | | 1:idle | 0:4 | 3:3 | 2:wait | | | |
| 9 | | | | | 1:5 | 0:4 | 3:wait | 2:wait | | |
| 10 | | | | | 2:6 | 1:5 | 0:0 | 1:wait | | |
| 11 | | | | | 3:7 | 2:6 | 1:1 | 0:0 | | |
| 12 | | | | | 0:8 ✓ | 3:7 | 2:2 | 1:1 | | |
| 13 | | | | | | 0:8 | 3:3 | 2:2 ✓ | 1:wait | |
| 14 | | | | | | 1:9 | 0:4 | 3:idle | 2:wait | |
| 15 | | | | | | 2:10 | 1:5 | 0:idle | 3:wait | |
| 16 | | | | | | 3:11 | 2:6 | 1:idle | 0:0 | |
| 17 | | | | | | 0:12 | 3:7 ✓ | 2:idle | 1:1 ✓ | |
| 18 | | | | | | 1:13 | 0:idle | 3:idle | 2:idle | |
| 19 | | | | | | 2:14 ✓ | 1:idle | 0:idle | 3:idle | |
| 20 | | | | | | | 3:idle | 2:idle | 1:idle | 0:0 ✓ |

Fig. 11

|      | Pixel Value |       |       |       |       |       |       |       |       |       |
| Time | 2    | 0      | 5      | 1      | 8      | 15    | 7     | 2     | 1     | 0     |
| ---  | ---  | ---    | ---    | ---    | ---    | ---   | ---   | ---   | ---   | ---   |
| 0    | 0:0  |        |        |        |        |       |       |       |       |       |
| 1    | 1:1  | 0:0 ✓  |        |        |        |       |       |       |       |       |
| 2    | 2:2 ✓| 1:idle | 0:0    |        |        |       |       |       |       |       |
| 3    | 3:idle| 2:idle| 1:1    | 0:0    |        |       |       |       |       |       |
| 4    |      | 3:idle | 2:2    | 1:1 ✓  | 0:0    |       |       |       |       |       |
| 5    |      |        | 3:3    | 2:idle | 1:1    | 0:0   |       |       |       |       |
| 6    |      |        | 0:4    | 3:idle | 2:2    | 1:1   |       |       |       |       |
| 7    |      |        | 1:5 ✓  |        | 3:3    | 2:2   | 0:0   |       |       |       |
| 8    |      |        | 2:idle |        | 0:4    | 3:3   | 1:1   |       |       |       |
| 9    |      |        | 3:idle |        | 1:5    | 0:4   | 2:2   |       |       |       |
| 10   |      |        |        |        | 2:6    | 1:5   | 3:3   | 0:0   |       |       |
| 11   |      |        |        |        | 3:7    | 2:6   | 0:4   | 1:1   |       |       |
| 12   |      |        |        |        | 0:8 ✓  | 3:7   | 1:5   | 2:2 ✓ |       |       |
| 13   |      |        |        |        | 1:idle | 0:8   | 2:6   | 3:idle|       |       |
| 14   |      |        |        |        | 2:idle | 1:9   | 3:7 ✓ |       | 0:0   |       |
| 15   |      |        |        |        | 3:idle | 2:10  |       |       | 1:1 ✓ | 0:0 ✓ |
| 16   |      |        |        |        |        | 3:11  |       |       | 2:idle| 1:idle|
| 17   |      |        |        |        |        | 0:12  |       |       | 3:idle| 2:idle|
| 18   |      |        |        |        |        | 1:13  |       |       |       | 3:idle|
| 19   |      |        |        |        |        | 2:14 ✓|       |       |       |       |

Fig. 12

DATA COMPRESSION FOR INDEXED COLOR IMAGE DATA

CROSS REFERENCE

Application Ser. No. 08/347,789 (filed on Dec. 1, 1994) is incorporated by reference herein. That application, commonly owned by the assignee of the present application, is for an invention by Michael Gormish and Martin Boliek, entitled "Data Compression for Palettized Video Images" (hereinafter "the Gormish/Boliek application").

BACKGROUND OF THE INVENTION

The present invention relates to the field of data compression, more specifically to compression of palettized image data.

Most research in image compression assumes a continuous-tone grayscale or color image is being compressed. With a continuous-tone image, a small error in the value of a pixel results in a small shift in color of that pixel. Palettized (or "indexed") images differ from continuous-tone images in that a small error in a pixel value might result in a completely different color. This is because the color value of a pixel is an index into a table of colors (palette). In the printing industry, palettized images are often referred to as "spot color" images. As should be apparent, the problems of highly compressing palettized images losslessly is also a problem in the printing industry.

With palettized images, generally no information about the eventual color of a pixel can be determined by the pixel's color value, without reference to the table of colors. While this might appear to be a drawback, it is quite useful where more than one image is used in a system where the only difference is the color table. For example, the negative (inverse) image of a palettized image can be obtained by merely replacing the colors in the color table with their inverses.

One drawback of palettized images is that they cannot be compressed by a lossy compression process, but must be compressed losslessly. Lossy compression processes are generally favored for image compression, since they generally provide high compression for little effort. A palettized image comprises two parts, the two dimensional array of pixel color values and the table of colors used to translate the pixel color values into colors, however since the table of colors requires much less memory than the array of pixel color values, compression is often only applied to the array of pixel color values with the table of colors included uncompressed with the compressed image.

The Gormish/Boliek application shows one method for efficiently compressing palettized images at high compression rates. Highly compressed palettized images are needed in many applications, such as game cartridges, which need storage for the images used in a game (video game, handheld player, computer game, etc.). Highly compressed palettized images are also desirable for use with on-line services and the "information superhighway." The World Wide Web (WWW) is becoming an increasingly popular form for disseminating information over the Internet. In part, the popularity of the WWW stems from the fact that the basic units of the WWW are HyperText Mark Up Language (HTML) documents, which can include imbedded graphics with text. These documents often include images which are palettized. Many users of the World Wide Web access these documents using a personal computer to connect to the Internet via a modem over ordinary telephone lines. With this configuration, a user is limited to data rates of 14,400 bits/sec or 28,800 bits/sec.

Thus, for timely reception of complex palettized images, the ability to highly compress these images for transmission is key to the continued popularity of the WWW. Although faster modems are being designed, there is already a demand for more complex graphics, and therefore compression will be necessary in the foreseeable future. Many images used in the WWW are stored and transmitted as Graphical Interchange Format (GIF) files, which uses Ziv-Lempel compression. Ziv-Lempel compression treats the image as a one-dimensional sequence of index values, ignoring the two-dimensional nature of image data.

Therefore, what is needed is a compression apparatus and method which uses the nature of palettized image data to highly compress the image data, as well as a corresponding decompressor.

SUMMARY OF THE INVENTION

The present invention provides improved compression of palettized image data by compressing (coding) the image data by color (for two-dimensional images, this is also referred to as "coding by color plane"). A color plane for a nonbinary image is a binary image in which each pixel color value of the nonbinary image is replaced by a bit indicating whether or not that pixel is "in" that color plane. A pixel is in a color plane if the pixel's color value is equal to a color value associated with the color plane. According to the invention, a compressor codes a first color plane, then codes a second color plane, and continues coding each subsequent color plane, until all the color planes which have pixels in them are coded except for the "last" color plane. In coding each color plane, pixels which are in previous color planes are ignored since a pixel can only be in one color plane. Because each coded color plane is a binary array, it can be coded by a binary image coder.

In decoding, the color planes are decoded in the same order. The first color plane is decoded and indicates which pixels are in the first color plane, then the second color plane is decoded to indicate which pixels are in the second color plane and which are in subsequent color planes (the coded second color plane gives no indication of which pixels are in the first color plane, nor does it need to). Once all but one coded color plane has been decoded, a decompressor infers that any remaining pixels are of the last color.

Of course, color plane coding of nonbinary images requires more passes than other coding such as bit plane coding. For example, an 8-bit color image is coded in 8 passes with bit plane coding, but might require up to 255 passes for a given pixel with color plane coding. To minimize the number of passes required, the color planes are ordered by density and the densest color plane is coded first, where density refers to the density of pixels in a color plane relative to the total number of pixels in the image. As explained above, a pixel is coded by representing it by a binary indication of whether or not the pixel is in the color plane being coded. After the first color plane is coded, pixels which are known to have colors of previously coded color planes are not coded. By coding the densest color planes first, the total number of passes is reduced.

In an alternate embodiment, each pixel color value is represented by a vector, and the components of the vectors are separately coded by "subcolor" planes, where each subcolor plane contains all the pixels which have a vector component value equal to the value for that subcolor plane. In this way, an image can be easily compressed in parallel.

In another alternate embodiment, each color plane is coded until a threshold number of pixels coded is reached, and then the remaining pixels are coded by bit plane.

An entropy coder uses context information to improve compression a pixel by optimizing the code used to code that pixel based on the likelihood of that pixel occurring given the pixel's context. Typically, in an image, the context of a pixel might be determined in part by its neighboring pixels. Where the image data is a collection of smaller images, such as sprites, characters, or a graphical menu, some neighboring pixels might be independent of the pixel being coded, so the context information includes pixel position information to further improve compression.

Because a coder requires more passes with color plane coding than with other coding schemes, a fast entropy coder is used. One such fast coding system is that taught by U.S. Pat. No. 5,272,478 (issued to Allen, et al. and assigned to the assignee of the present invention), which teaches the use of a B-coder as the bit generator for the above compression process. Alternatively, the Q-coder developed by IBM of New York, or the high-speed binary entropy coder taught by U.S. Pat. No. 5,381,145 (issued to Allen, et. al. and also assigned to the assignee of the present invention).

The present invention also provides novel apparatus for performing parallel encoding and decoding. In one embodiment, an image is divided into bands, one per coder. Each coder operates independently of the others. If necessary, fixed context pixels are substituted where the coder would otherwise refer to the values of pixels outside its band. The bands can then be decoded independently in parallel.

In another embodiment, multiple coders pass over the entire image coding for particular color planes. If necessary, the image is stored in a memory which can be accessed simultaneously by multiple coders, to avoid loss of parallelism. In this embodiment, coders pass over the image at variable rates depending on the data they encounter (low density color planes will get processed faster than high density color planes). The coders are paused if necessary to avoid multiple accesses to the same memory or if coding a pixel for a given color plane requires context from pixels not already coded.

In yet another embodiment, multiple coders pass over the entire image, but are not free to operate at any speed. For example, the coders might be held to a fixed offset or within a limited window which ensures that two coders don't access the same pixel at the same time and that no coder accesses a pixel for which context pixels have not already been coded.

As should be apparent, the present invention is also applicable to the compression of non-image related data, where similar characteristics of the data to be compressed exist and similar needs for compression are present.

A further understanding of the nature and advantages of the inventions herein may be realized by reference to the remaining portions of the specification and the attached drawings.

BRIEF DESCRIPTION OF THE DRAWINGS

FIG. 1 is a schematic diagram showing the separation of an image into color planes;

FIG. 10 is a table showing how the coders in parallel coding system of FIG. 9 might progress over the pixels of an image where the coders are constrained to operate on consecutive pixels and the coders do not progress until the trailing pixel is coded;

FIG. 11 is a table showing how the coders in parallel coding system of FIG. 9 might progress over the pixels of an image where the coders are constrained such that once coding on a pixel starts, coding completes before a new pixel is coded; and FIG. 12 is a table showing how the coders in parallel coding system of FIG. 9 might progress over the pixels of an image where the coders are constrained such that coding on a new pixel is started whenever a leading coder is available.

DESCRIPTION OF THE PREFERRED EMBODIMENTS

Figure 2:
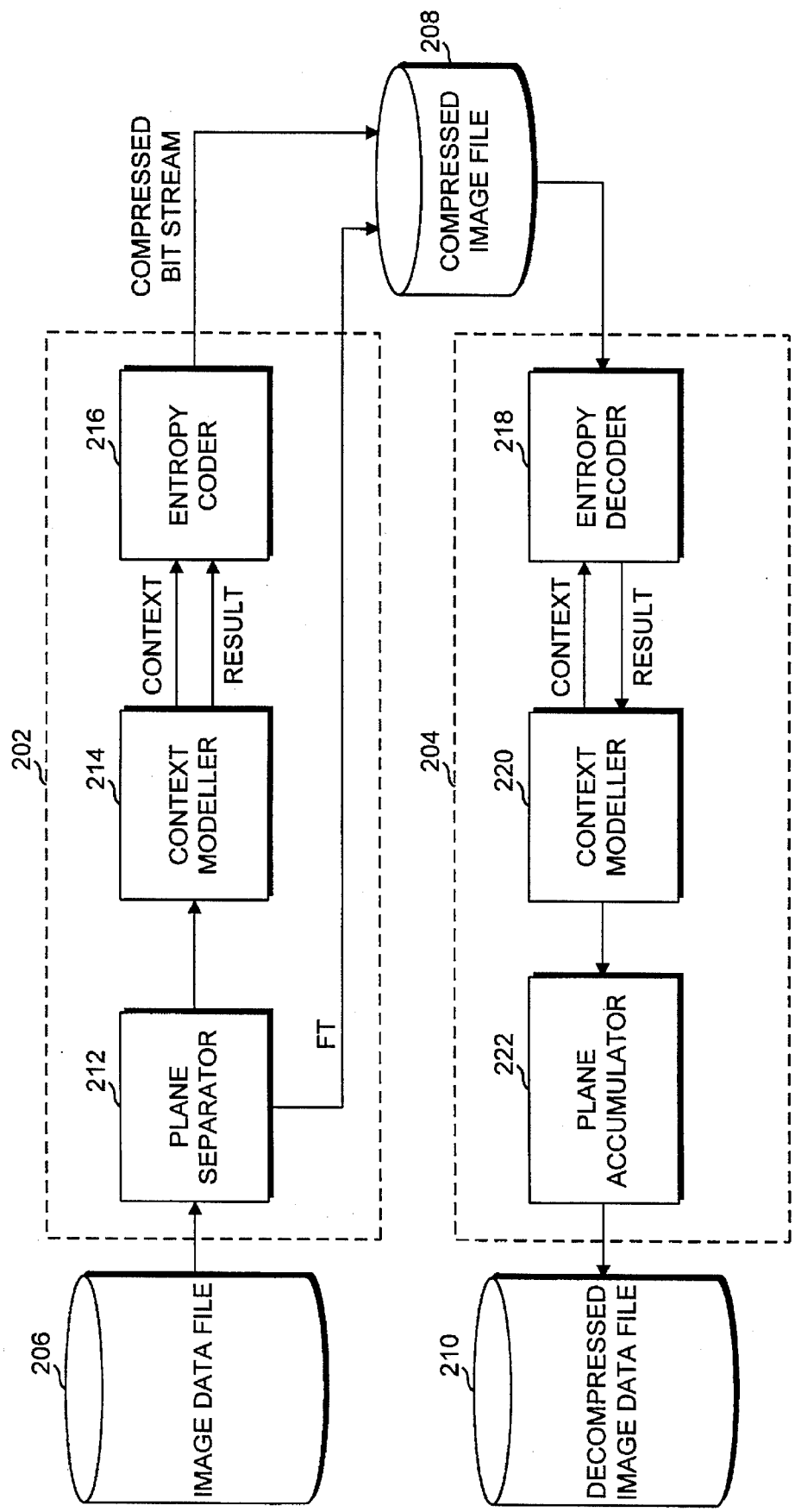
FIG. 2 is a block diagram of a compressor and decompressor according to the present invention.

FIG. 1 is a schematic diagram showing separation of an image into color planes. As will be explained below, although an image separated by color plane is larger than an unseparated image (for 8-bit color, the difference is 256 bits/pixel vs. 8 bits/pixel), the separated image is usually compressible to a smaller size than the unseparated image.

A digital image is represented by a two-dimensional array of pixels, where each pixel has a location within an image grid image and each pixel a color value. For clarity, FIG. 1 shows only a 3 by 3 image with 16 possible pixel color, while in practice images contain many more pixels with many more possible colors. For example, in a specific embodiment, an image is formed by an array of 1024 by 1024 pixels and each pixel has a color value selected from a palette of 16.8 million colors (24-bit color).

FIG. 1(a) shows each pixel with a label indicating its position in the image, with a first digit indicating the row for the pixel and a second digit indicating the column.

FIG. 1(b) shows the color value for each pixel. The color value is an integer value from 0 to 15, although not all the color values happen to appear in the image of FIG. 1. Note that color 7 is the most frequent color value, as five of the pixels are of color 7.

FIG. 1(c) shows the image separated into separate color planes and shows a binary bit stream representing the separated color planes. Each pixel of a separated color plane has one of three values: "1" indicates that the color of the pixel matches the color of the color plane, "0" indicates that the color of the pixel does not match the color of the color plane and the color plane the pixel matches has not already been coded. "—" indicates that the color of the pixel matches a color of a color plane which has already been coded. The color of pixels labelled with "—" will have already been decoded when a decoder encounters them, so no further information is needed about this pixel. Therefore, this pixel need not be coded and the resulting binary stream contains only the "1"s and "0"s from the separated color planes. Also, unless the order of the color planes is fixed, a table of the order of color planes (usually they are ordered by frequency, hence the label "FT" for the frequency table) is included with the data stream.

In a typical embodiment, temporary storage is limited, so the color plane separation is not a physical separation, but a logical one. Thus, FT is generated and used to determine that color plane 7 should be coded first. As each pixel is read from the image, a "1" is output if it is a pixel of color 7, otherwise "0" is output. For subsequent color planes, a "1" is output for pixels in that color plane, a "0" is output for pixels in color planes which follow the current color plane in the frequency table, and nothing is output (denoted by "—" in FIG. 1(c)) for pixels in color planes which come before the current color plane in the frequency table, as these pixels have already been fully coded. By arbitrary convention, color planes with the same density are ordered lowest color number first. Thus, in FIG. 1, color plane 3 comes before color plane 4 (not shown). Also, since color plane 4 is the last color plane, it need not be coded. The color planes of unused colors (e.g., color planes 0, 1, 2, 5, 6, 8, 9, 10, 11, 13, 14 and 15 in FIG. 1) also do not need to be coded.

A decompressor receives the binary bit stream (after decoding it) and must reassemble the image from just the information in the bit stream. If the bit stream of FIG. 1(c) is provided to a decoder, and the coder and decoder agree that the image size is 3×3, the decoder will determine that the most frequent color plane is color plane 7 and that the first nine bits in the bit stream after the FT belong to that color plane. Since color plane 7 has four "0" bits, the decoder will also determine that next color plane will be coded by the next four bits of the bit stream. The decoder will then determine from FT that these four bits are for color plane 12, that the next color plane is color plane 3, that color plane 3 is coded in the next two bits of the stream (since color plane 12 has two "0" bits), and that the last color plane is color plane 4. It follows then that all the remaining color planes are empty.

As should be apparent, the above process can be used to compress data which is not image data or which does not involve colors, by recognizing that each element (such as a byte) of a data block to be compressed is analogous to a pixel's color value, and an "element" plane groups elements having values equal to the value associated with that element plane in the manner that pixels of like color are grouped into color planes.

FIG. 2 shows a compressor 202 and a decompressor 204 which might be used to implement the process just described. Compressor 202 reads uncompressed image data (pixel color values) from a file 206 and converts the data into compressed image data which is shown stored as file 208. This file 208 is used by decompressor 204 to reconstruct the original image into a reconstructed image data stored in file 210. Because lossless compression is used, file 210 is an exact copy of file 206.

Compressor 202 is shown comprising a plane separator 212, a context modeller 214 and an entropy coder 216. Decompressor 204 is shown comprising an entropy decoder 218, a context modeller 220 and a plane accumulator 222. Files 206, 208, 210 are fries on a disk storage device or blocks of memory in a computer memory.

In compressor 202, plane separator 212 has an input for reading data from file 206 and an output for color plane separated data (value of "1", "0" or "—"; pixel location; etc.). Context modeller 214 has an input for the color plane separated data and two outputs, one which outputs a result and one which outputs a context for that result. Entropy coder 216 has inputs for the result and its context, and has an output for a compressed bit stream, which is stored in file 208.

In decompressor 204, entropy decoder 218 has an input for the compressed bit stream, an input for a context and an output for outputting a result; context modeller 220 has an input for receiving the result from entropy decoder 218, an output for providing a context to entropy decoder 218 and an output for providing a color plane bit stream; and plane accumulator 222 has an input for accepting the color plane bit stream from context modeller 220 and an output for outputting images to file 210.

In the World Wide Web environment, file 206 is compressed to file 208 beforehand, and file 208 is provided to a WWW server and thus made available to users of WWW browser clients. These WWW clients would then include decompressor 204. Some browser clients store the uncompressed image data in a file such as file 210 while other browsers decompress the image for display without ever permanently storing it in a file unless the browser's user requests the image be saved.

Plane separator 212 converts an image into a bit stream similar to the bit stream shown in FIG. 1(c). This bit stream is then input to context modeller 214, which together with entropy coder 216, codes the bit stream. Context modeller 214 provides a context for each result passed to entropy coder 216, and that context either be an overall optimized context, or can vary depending on the images.

Plane separator 212 also outputs the color frequency table, FT, to file 208. Of course, where the order of colors is fixed in advance, FT does not need to be passed from compressor 202 to decompressor 204 for each file 208. If needed, the table of colors which maps the pixel color values to colors is also included with file 208.

Because decompressor 204 must be able to reconstruct the image from the coded (compressed) image, only pixels which were previously coded can be used as context pixels for a current pixel. As is well known, pixels nearby the current pixel provide a useful context when coding the current pixel. In other coding schemes where a coder only makes one pass over the image from top to bottom and from left to right, the pixels below and the pixels to the fight of the current pixel cannot provide context for the current pixel, because these pixels will be unknown to the decompressor when the current pixel is being decoded. However, with the present invention, after the first color plane, the decoder will have information about the pixels below and pixels to the right, namely whether or not those pixels were in previously decoded color planes.

Figure 3:
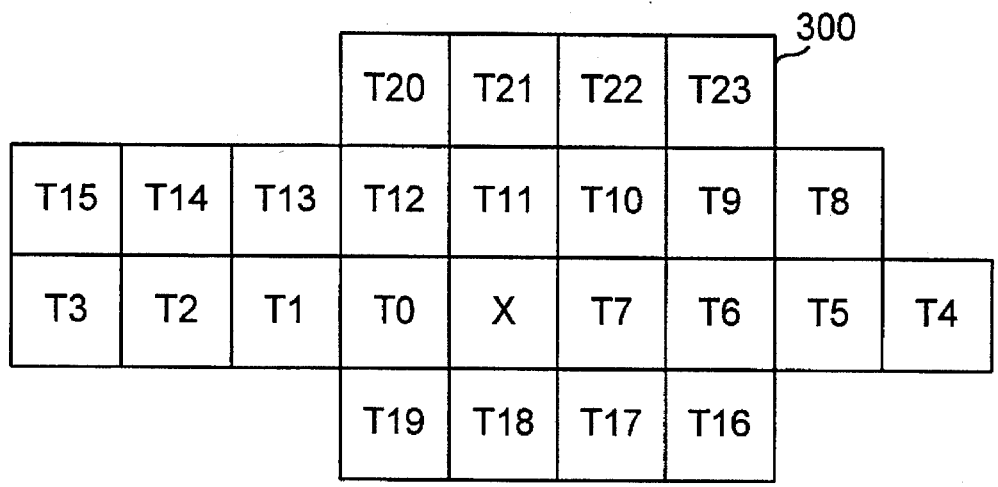
FIG. 3 is a schematic diagram of a context model template.
Figure 4:
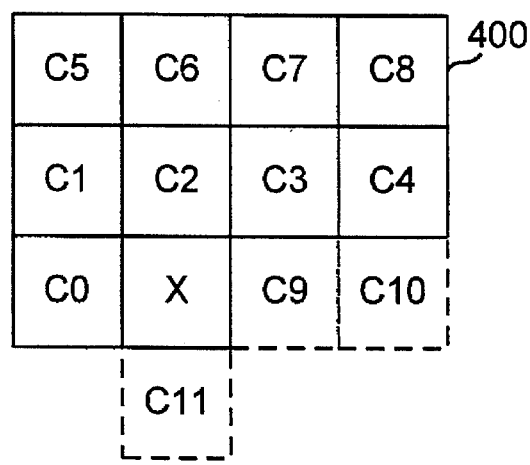
FIG. 4 is a schematic diagram of a context model.

FIGS. 3 and 4 illustrate how a context is formed. FIG. 3 shows a context model template 300. A context model template serves to label relationships between a current pixel and potential context pixels using in the coding/decoding of the current pixel. In context model template 300, the location of the current pixel is indicated with an "X", and surrounding pixel locations are labelled from T0 to T23. In practice, a context model will typically use less than all of the context pixels available in a template the size of template 300. For example, one moderately complex coder might use the color values of the context pixels T0 and T2. If the color values are represented by eight bits, then 65,536 (($2_8$)$^2$) different contexts are possible for each of 256 possible current pixel color values. If only one bit, indicating whether or not the context pixel is in the current color plane, is used, then context can be provided by more pixels.

FIG. 4 shows a context model 400 which indicates the context used for a coder. Context model 400 is based on the context model template 300. The Gormish/Boliek application teaches how to design a coding system where the context model is a dynamically changing function of the context model template. With context model 400, nine context pixels can be used since each pixel only requires one context bit, namely a bit indicating whether or not the context pixel is in the current color plane. In FIG. 4, the current pixel for which a context is needed is denoted by an "X" and its context pixels are labelled from C0 to C8.

Alternatively, the context provided by a context pixel could be a bit indicating whether or not the pixel has been already coded/decoded, or the context might be one of three values, indicating that the context pixel is in a previously coded color plane, the current color plane, or a yet uncoded color plane. Some of the context can also be provided by pixels to the right of and below the current pixel, such as C9–C11. For these pixels, the context bit indicates whether or not those pixels are in previously coded color plane. For non-parallel coding systems (and some parallel coding systems), the context bits for pixels C9–C11 are already known by the time the current pixel is being decoded.

Depending on the image dam, a context model mask such as that shown in the Gormish/Boliek application could be used to dynamically modify context model 400 to select which of bits of the pixels in context model template 300 will affect the context. If needed, information about how context model 400 is dynamically modified could be included as part of file 208. Also, if underlying structure exists in the image data and the image is formed of independent subimages, such as blocks of eight by eight pixels defining characters or sprites, then a pixel's position within a character or sprite could be used as additional context information. For example, where a bit indicates whether or not the current pixel is in the first row of a character or sprite, that bit might be valuable context information, as the context pixels above a pixel in a first row are pixels from different characters or sprites and tend to be more unrelated compared with pixels within the character or sprite.

Referring again to FIG. 2, decoding is performed in a manner opposite as the decoding process. Plane accumulator 222 accepts the bit stream from context modeller 220 and fills an internal buffer, starting with the pixels having the most frequent color. When all the bits are received and decoded, the internal buffer will contain the image which can then be read out into file 210. Alternatively, the pixels can be output as they are received to file 210, which is simple to implement where file 210 is randomly accessible. If an internal buffer is used, it can be preloaded with pixels all set to the color value of the color plane known to be the last occurring color plane. If the buffer is preloaded, having the color of the last occurring color plane would serve as a flag indicating that the pixel has not yet been decoded.

Figure 5:
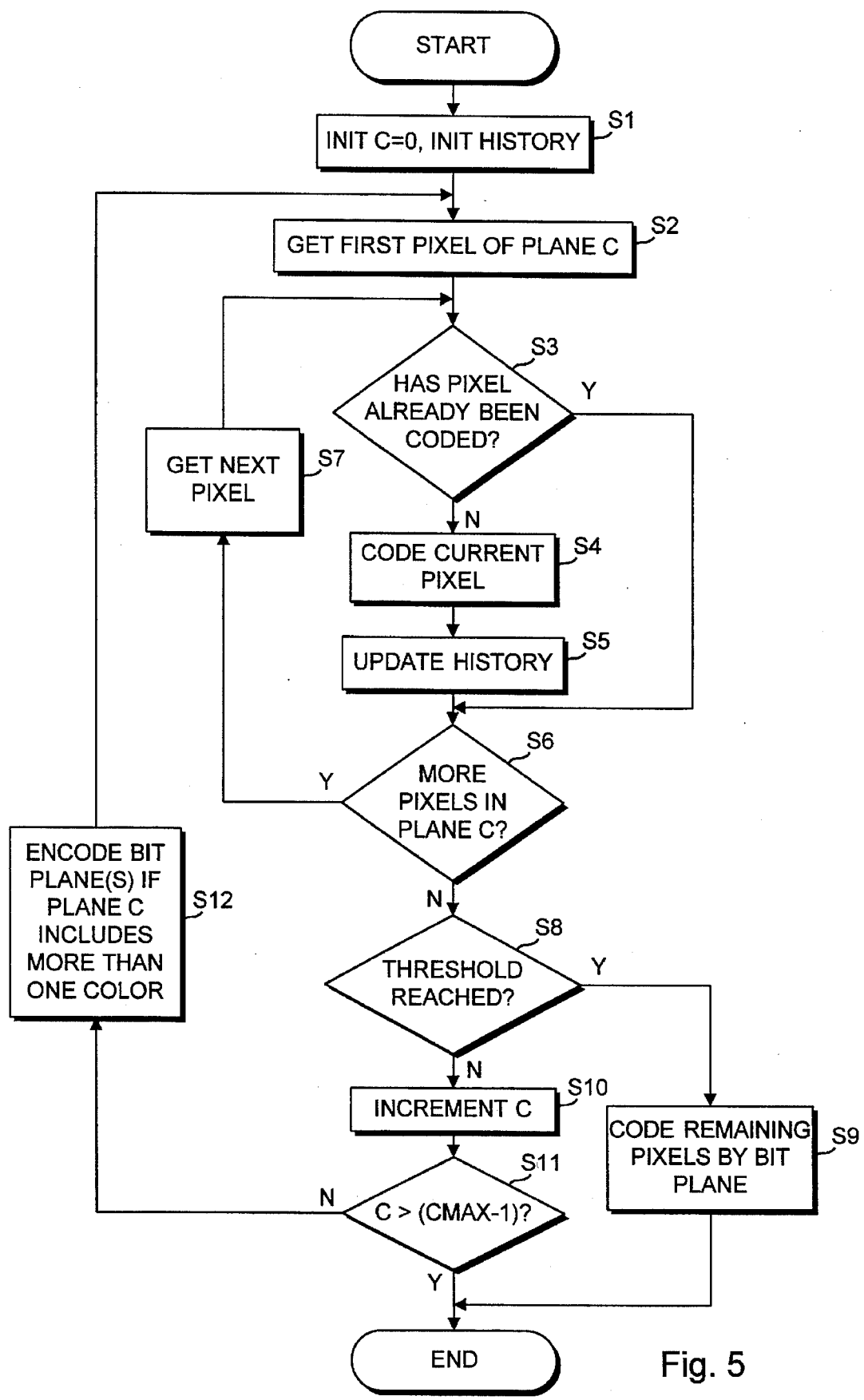
FIG. 5 is a flow chart of a process according to the present invention for coding color planes in a compression system.

FIG. 5 is a flow chart of a process for coding pixels according to the one embodiment of the present invention. As should be apparent from this detailed description, the operation and characteristics ascribed to a coder apply as well to a decoder. A coder converts a first bit stream to second bit stream based on a current bit being coded and information about previously coded bits, where the second bit stream preferably includes fewer bits than the first bit stream. A decoder converts the second bit stream into the first bit stream by performing the same actions as the coder to determine which current bit(s) of the first stream could have created the current bit(s) of the second stream, given the information about previously coded bits (which the decoder has available to it because the decoder has already decoded those bits). Therefore, a coder is equivalent to a decoder, so long as the coder does not rely on information which has not already been coded or might not already have been decoded when the current bit is being decoded. Thus, for readability, the term "coder" is used to apply to both a coder in a compressor and a decoder in a decompressor.

Referring again to FIG. 5, the coding process begins by initializing a pointer, C, to the first color plane (step S1) and initializing a history array of the same size as the image. The history array stores one bit for each pixel of the image and each bit is initialized to zero. The ordering of the color planes can be done beforehand, so that the first color plane is the densest color plane, but this process can also be performed without ordering the color planes at all, although without ordering, more coding operations might be required. Alternatively, the colors can be reordered so that the color values are in frequency order.

However the color planes are ordered, the first pixel of color plane C is read (step S2), and plane separator 212 checks the history array to see if the pixel has already been coded (step S3). If the history array has a "1" bit for that pixel, it has already been coded, otherwise the bit will be "0". If the pixel has not already been coded, it is coded (S4) and the history bit for that pixel is set to "1" (S5).

After the pixel is coded, or after it is found to be coded already, plane separator 212 checks for more pixels in the current color plane (S6). If there are more pixels, the next pixel is obtained (S7) and the process repeats from step S3. Otherwise, plane separator 212 checks to see if a threshold number of pixels or color planes has been processed (S8). If they have, the remaining pixels are coded using bit plane separation (S9). Otherwise, C is incremented to point to the next color plane (S10). Plane separator 212 then checks so see if there is less than one remaining color plane [C> (CMAX-1)] (step S11). If not, the coding process ends, otherwise the process continues back at step S2 with the first pixel of the next color plane. In some embodiments, there is no threshold to be reached and the entire image is processed by color plane separation (i.e., step S9 is never reached). In other embodiments, the color plane separation separates pixels into color group planes comprising more than one color per color group. In these embodiments, a step of residual coding for bit plane is performed following step S11 before reaching step S2 (optional step S12).

Because an image with a large number of colors (256 or more) can require a large number of passes for encoding or decoding, it is useful to be able to do these operations in parallel on parallel hardware. The high-speed binary entropy coders described above allow entropy coding to be done in parallel while providing only a single compressed output fie, which is the necessary output for most systems. For parallel operation to provide a speed advantage, the context modellers and coders must be able to operate in parallel, i.e., process data without reference to, or the need to wait for, other context modellers or coders. Of course, a parallel coding system with N parallel paths might not always operate N times as fast as a single path, since some paths might be waiting for other paths to generate needed information or complete an access to memory for which there is contention.

If a high-speed binary entropy coder is used with bit plane coding, a parallel context modelling system where each context modeller operates on one bit plane is an easy way to do parallel processing, especially if the data is pre-processed such that splitting it into the bit planes doesn't adversely affect the compression efficiency as is taught by Zandi, et at., in U.S. Pat. No. 5,471,207, entitled "Compression of Palettized Images and Binarization for Bitwise Coding of M-ary Alphabets Therefor" (filed Feb. 23, 1994 and assigned to the assignee of the present application; hereinafter referred to as "Zandi"). However, with color plane coding, the data must be separated by a criterion other than by pixel value.

Several systems for parallel coding by color plane using context models are described below. In each of these, N is the number of parallel coders available. In one system, the image is divided into N bands of pixels, or other divisions of the image, and each band or division is coded by one coder. Division by bands is convenient and limits the loss in compression ratio due to each coder having less than all the information provided by the full image.

Where the image is divided by bands, context pixels which would otherwise be in a different band than the pixel being coded are replaced by known pixels, such as pixels having the most frequent or first color, so that context for pixels within a band are determined only by pixels within the band.

Figure 6:
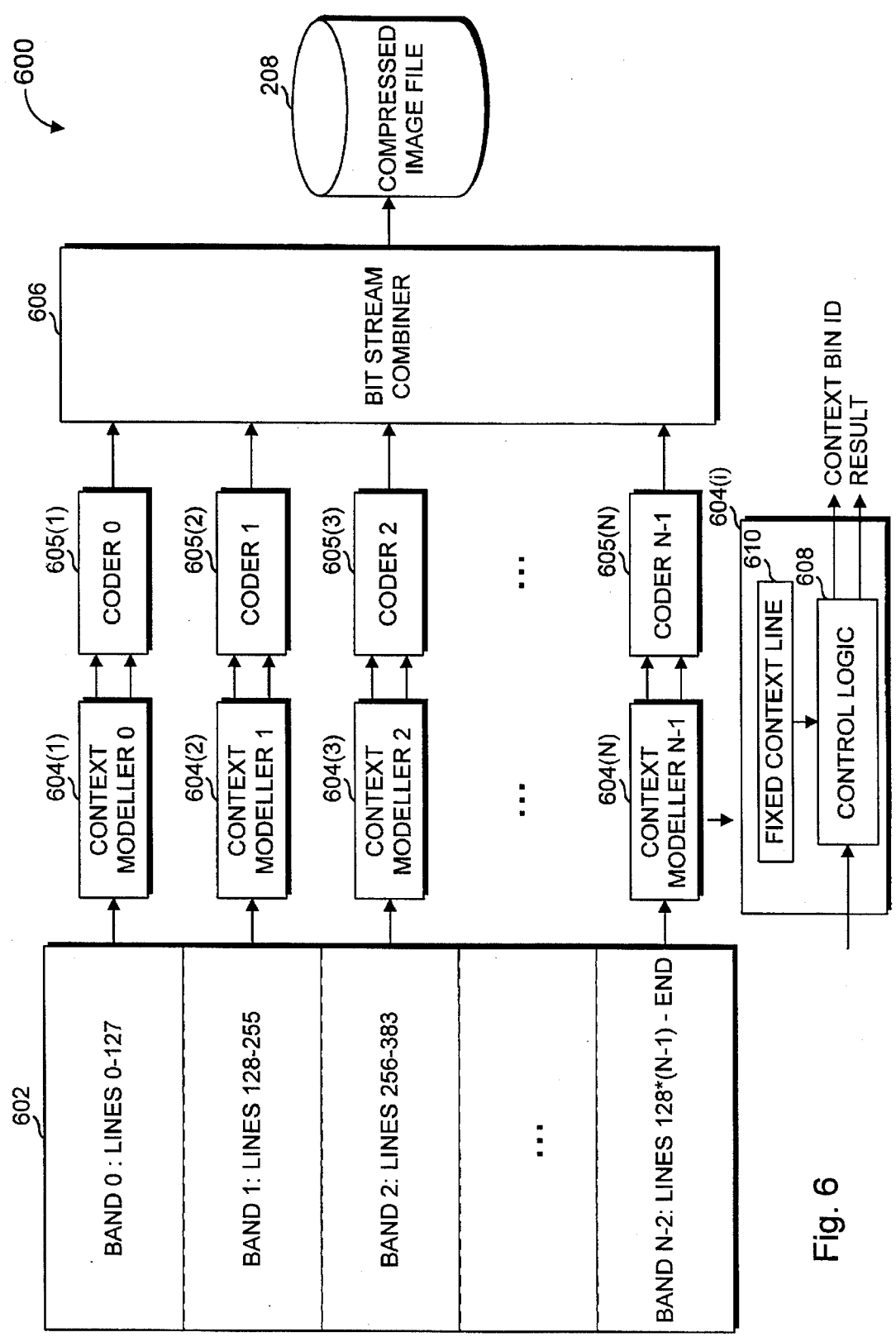
FIG. 6 is a block diagram of a parallel coder for color plane coding.

FIG. 6 is a block diagram of such a parallel coding system 600. Image buffer 602, which contains the array of pixel color values representing the image, is logically divided into N bands of 128 lines each. This image buffer is either a memory area separate from input file 206 or image file 206 is operated upon directly and image buffer 602 is just a different logical view. A band is input to a context modeller 604 and the two outputs of the context modeller are input to a coder 605. The outputs of coders 605(0)-(N-1) are input to a bit stream combiner 606, which outputs a single compressed data stream to file 208. The operation of bit stream combiner 606 is similar to that shown in U.S. Pat. No. 5,381,145 (cited above).

One context modeller 604 is shown in greater detail, including control logic 608 and a buffer 610 for holding a fixed context line. Context modeller 604 operates as a conventional context modeller, providing a context bin ID and a result bit to a coder 605, except when context modeller 604 is providing a context which might otherwise be dependent on pixels outside of its band. In these cases, control logic 608 uses pixel values from buffer 610 to form the context instead of using pixels from outside the band. This substitution makes the coding, and therefore also the decoding, of each band independent of the pixels in the other bands.

If context is provided by pixels to the left of and above the current pixel, context modeller 604 inputs those pixels either from internal storage or from image buffer 602. As an example, context modeller 604(1) might normally refer to line 127 to determine context for pixels in line 128, but here uses buffer 610 as a substitute for line 127. Of course, if the substituted line is a line of pixels all having the same color, such as the most frequent color, buffer 610 need only be large enough to store one color value. In other embodiments, the contents of buffer 610 is fixed ahead of time or is otherwise determinable without reference to other bands.

With the loss of true context information due to the substitution, compression efficiency is reduced somewhat, however it is only reduced for one out of 128 lines. If the bands cannot be as thick as 128 lines each, or if memory space for image buffer 602 is not available or is prohibitively expensive, then another means of performing parallel operation might be better.

In some transmission systems, especially with WWW images, latency of portions of an image is an issue. For example, it is often desirable to display pixels as they are received even if the entire image is not yet received. With the system shown in FIG. 6, each band is coded, and therefore, decoded more or less at the same time. To reduce latency, and therefore be able to display the top portions of the image first, a parallel coder might be configured to process the image in order from top to bottom.

For example, one coder might code for color plane 0 only, staying several pixels ahead of another coder coding for color plane 1. If fewer than N coders are provided, the first coder will finish one line and code that line for color plane N, the next coder color plane N+1, as so on. In order for this to provide a speed increase, the memory used to hold the image must allow multiple simultaneous read operations or must be divided into multiple banks each independently accessible by different coders.

Figure 7:
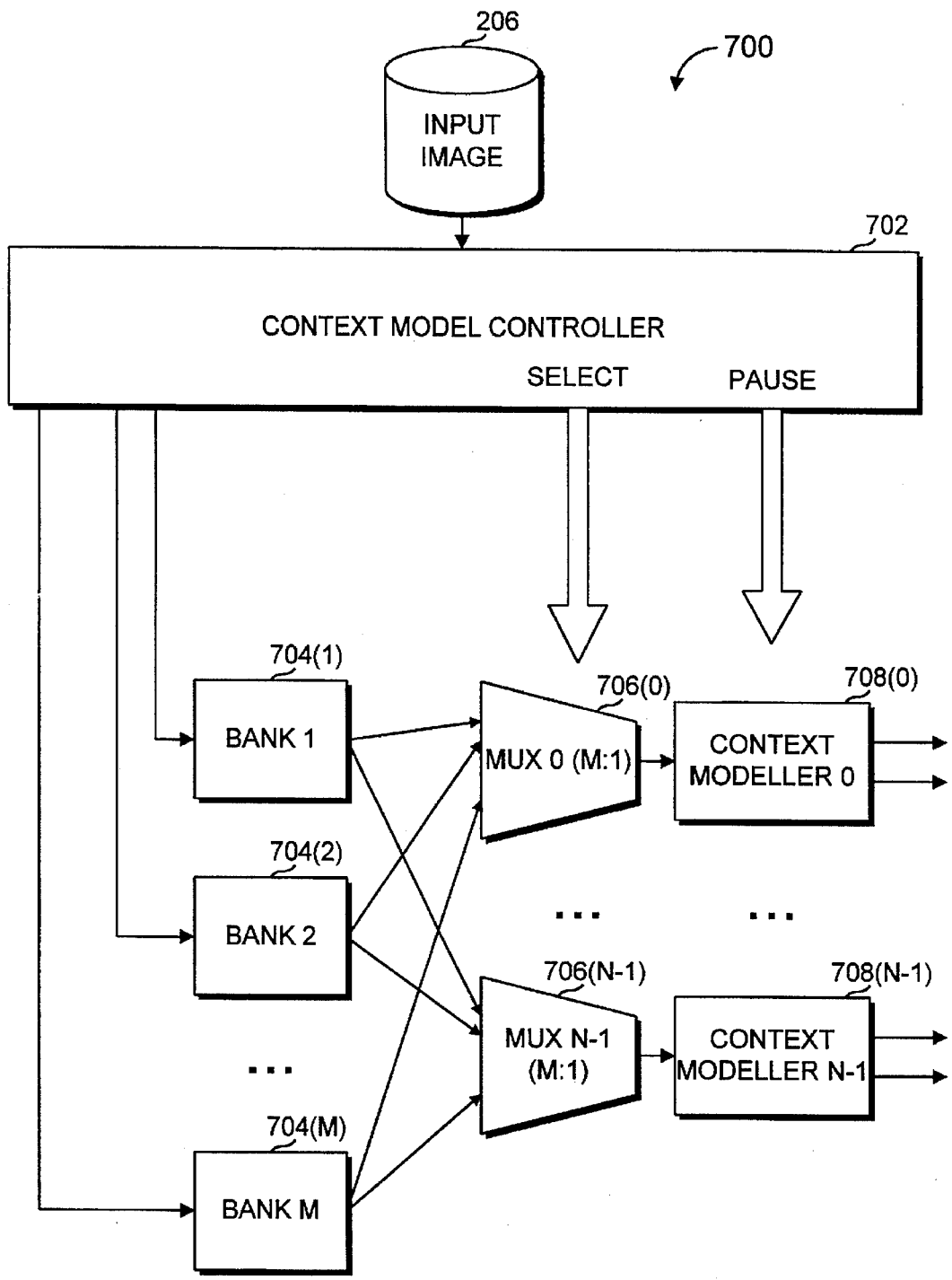
FIG. 7 is a block diagram of a parallel coding system.
Figure 8:
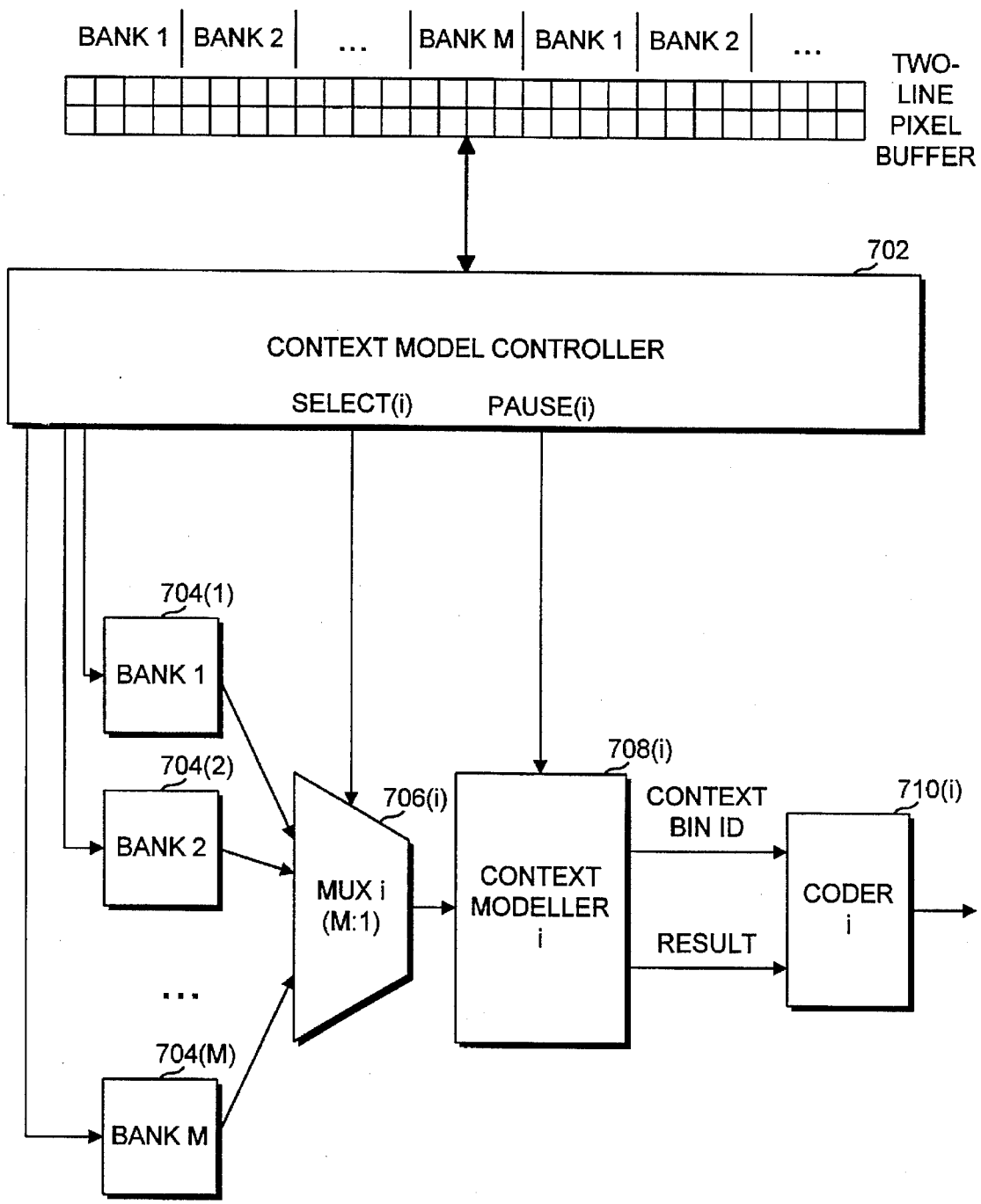
FIG. 8 is a more detailed block diagram of the parallel coding system shown in FIG. 7, wherein only one coder is shown.

FIGS. 7 and 8 show such an alternate parallel coding system 700. Compared with parallel coding system 600, parallel coding system 700 uses more accurate context information at the expense of possibly slower parallel operation. In this system, each context modeller passes over the entire image and provides context for one or more color planes, whereas in system 600, each context modeller provides context of each pixel in its band for each color plane. When a timing conflict occurs (an attempt by more than one context modeller to read a memory location), one or more context modellers are paused for a processing cycle, which is why the overall system might be slower than a pure parallel operation. To mitigate the memory contention problem, the image is parsed into memory banks to widen the memory path. So long as each line is completely coded before the next line is coded, and pixels from the line being coded do not contribute to the context of a pixel being coded, no causality problems occur.

As shown, pixel values are read from input image 206 by a context model controller 702. Controller 702 parses out the pixel values to M memory banks 704(1)-(M) and controls the SELECT lines of N M-to-1 multiplexers 706(0)-(N-1), to provide a wider memory path to an array of context modellers 708(0)-(N-1). Each context modeller 708 has two outputs, one for a context bin ID and one for a result bit. These outputs feed to a parallel entropy coder 710 (shown in FIG. 8).

FIG. 8 shows one context modeller 708(i), one coder 710 and context model controller 702 in further detail, including a single select output and a single pause output of context model controller 702. As should be apparent from the figures, each multiplexer 706 is coupled to a corresponding select output of context model controller 702 and each context modeller 708 is coupled to a corresponding pause output of context model controller 702. The purpose of the select(i) output is to control multiplexer 706(i) so that context modeller 708(i) receives input pixels as needed from the proper memory bank 704. As should be apparent from the above description, the parallel coding system could operate without the multiple memory banks 704(1)-(M) and multiplexers 706(1)-(N). The purpose of pause(i) output is to pause context modeller 708(i) when that context modeller is about to determine a context based on pixel values of pixels which have not already been coded (and in the case of a decoder, when the context modeller requires pixel information which has not yet been decoded).

A parallel coding operation is as follows. Context modeller controller 702 reads pixel values from input file 206 and stores two lines of the image into memory banks 704(1)-(M). In this example, each memory bank holds eight pixels and the banks are reused once their contents are no longer needed. Of course, if context is provided by more than two rows of pixels, the memory banks should accommodate more than two rows. Multiplexer 706(i) provides the pixels to context modeller 708(i). Since context modeller controller 702 tracks the progress of context modeller 708 (i), it is aware of which pixels are being used for context and which pixels have already been coded. If a pixel is needed for context, but has not be coded, context modeller controller 702 pauses context modeller 708(i) until that pixel has been coded.

In the example of FIG. 7, context modeller 708(0) starts processing pixels 0..3 of a line, coding only pixels in color plane 0, while context modeller 708(1) does nothing (because its contexts will depend on whether or not pixels 0..3 are in color plane 0). When context modeller 708(0) proceeds to pixels 4..7, context modeller 708(1) starts on pixels 0..3, provided by memory bank 704(1). This avoids a memory conflict, since context modeller 708(0) has moved on to memory bank 704(2) where pixels 4..7 are stored.

When both context modellers 708(0) and 708(1) have finished a set of four pixels, the select inputs of multiplexers 706(0) and 706(1) are changed so that memory bank 704(3) is coupled to context modeller 704(0) and memory bank 704(2) is coupled to context modeller 704(1). Thus, context modeller 708(0) codes color 0 for pixels 8..11 while context modeller 708(1) codes color 1 for pixels 4..7. Because memory bank 704(1) is now free, context modeller 708(2) can now process the pixels in that bank for color plane 2. If the number of colors is greater than the number of context modellers, then context modeller 708(0) processes color planes 0, N, 2N, etc., while context modeller 708(1) processes color planes 1, N+1, 2N+1, and so on.

For each pixel which has not already been coded, a context modeller passes on context information and a result bit indicating whether or not the current pixel is in the current color plane. This information is passed to a coder, which codes the information as explained above. Once a line is processed, another line is read from the input file into the memory banks 704(1)-(M). As each line is being processed and pixels therein are coded, the pixels in the current color plane are flagged to indicate that they belongs in an already processed color plane so that subsequent context modellers for subsequent color planes can skip those pixels. Where a context modeller and coder are able to skip a number of pixels, they may be ready to process the next set of four pixels before the context modeller and coder ahead of them has processed the leading bank of pixels. When this occurs, context modeller controller 702 issues a pause signal to the following context modeller. The coder need not be paused, since it is paced by the output of the context modeller.

The example just described uses 4 pixels per bank, M banks of memory and N coders, however, it should be apparent that different numbers of these components can be used. Using this system, a plurality of context modellers can operate in parallel to provide context for pixels in an image by color plane by using a plurality of memory banks and staggering the start times of the context modellers so that they start processing one bank of memory approximately at the same time the context modeller ahead of it moves on to the next memory bank. If a context modeller is able to process pixels faster, such as where it encounters many pixels which have already been processed, and it will next read a pixel from a memory bank in use by the context modeller ahead of it, that context modeller is paused until the memory bank is free.

In the example just described, the coders (or more precisely, context modellers and coders) operate at independent rates, as coders skip over pixels which are in previously coded color planes. In yet another variation of a parallel coding system, the coders are tied together in some way. While this might reduce the amount of parallelism as some coders wait for other coders to catch up, it requires less hardware, since the coders do not "run into" each other. With the coders tied together, the parallel coding system does not need the memory banks and multiplexers. If the multiplexers are constrained so that N parallel coders always operate different pixels within a window of pixels, bandwidth to memory is not a problem.

Figure 9:
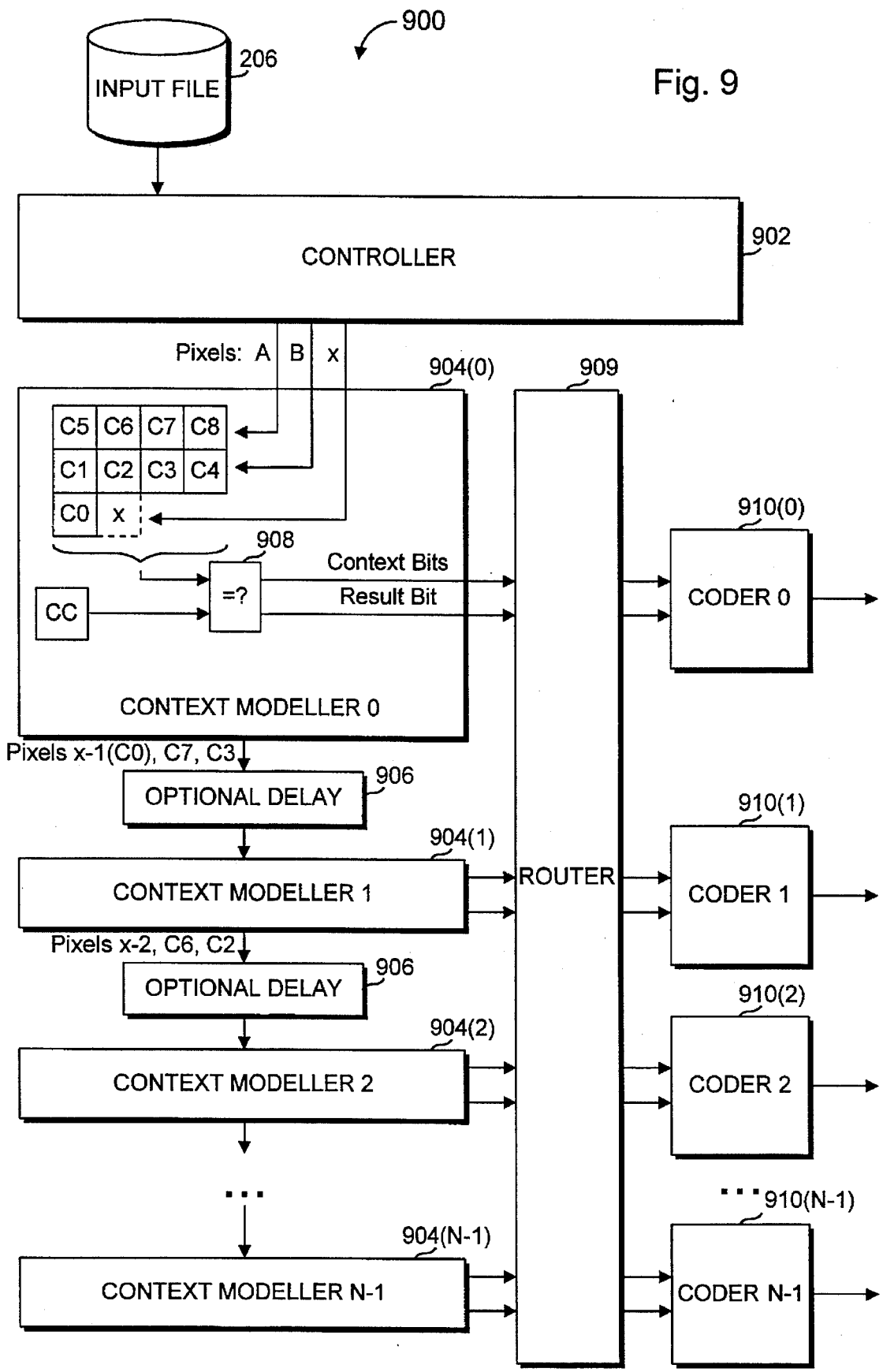
FIG. 9 is a block diagram of a parallel coding system in which the progress of coders is tied to the progress of other coders.

FIG. 9 is a block diagram of such a simplified parallel coder 900. In parallel coder 900, a controller 902 reads pixel values from the input file 206, and passes pixel values, each clock cycle, to a first context modeller 904(0), and the pixel values are in turned passed on to other context modellers 904. Logically, the context modellers are scanning over the image, with context modeller 904(0) in the lead and the other context modellers following it. A router 909 is provided to couple the context modellers 904 to coders 910(0)-(N−1).

In the simplest case, router 909 simply connects each context modeller straight across to the corresponding coder. However, to save memory in the coders, the order of the coders might be rearranged. The memory savings comes from assigning each color to only one coder, since each coder must include memory for context bins and a set of context bins is needed for each pixel color. Thus, if only one coder handles a given color, the context bins for that color don't need to be duplicated at more than one coder. However, if each coder is limited to certain colors, the coders might have to operate on pixels out of order. This is explained in more detail below in connection with FIGS. 10–12. When the coders 910 are out of order, router 909 routes the context bits and the result bit to the proper coder 910. While router 909 might have been avoided by having the context modellers 904 rearrange their order to follow the coders, this would waste memory, since each context modeller would have to maintain more context pixels.

In the example shown, context modeller 904(0) obtains a nine-bit context for a current pixel, X, from the nine pixels labelled C0–C8. Only one bit of context is used for each pixel, namely a bit indicating whether or not the pixel is in the current color plane. Of these nine pixels, four are pixels in the row above pixel X, four are in the row above that and one is the pixel to the left of pixel X. Of the pixels above pixel X, two are directly above, two are just to the left, and four are just to the right. The scanning order is, of course, from the top row to the bottom row and left to right within a row. Alternatively, other bits might be used as shown in FIGS. 3 and 4.

Context modeller 904(0) is shown in greater detail than the other context modellers 904(1)-(N−1). Each context modeller 904 includes storage for context pixels, storage for the current color plane (CC) being processed by that context modeller, a comparator 908, and two outputs, one for a context and one for a result. The context for pixel X is not the entire context pixels, but just a bit for each pixel indicating whether or not it is in the current color plane. Comparator 908 is used to generate the context from the CC value and the context pixels C0–C8. Comparator 908 is also used to generate the result bit, which is a bit indicating whether or not pixel X is of color CC. Although only one bit is used for each context pixel, the entire pixel is stored, so that context modeller 904(0) can pass it on to context modeller 904(1), which compares the pixel to a different CC value.

As shown in FIG. 9, controller 902 passes the current pixel X and two context pixels (A, B) to context modeller 904(0), which inserts the pixels as X, C4 and C8, respectively. After context modeller 904(0) has completed coding for pixel X, it accepts another three pixels, shifts each of its context pixels and its current pixel one to the left, while outputting the pixels C0, C7 and C3 to context modeller 904(1), which in turn shifts those pixels into its positions X, C8 and C4, respectively. An optional delay 906 is used for cases where a coder includes some latency, usually due to pipelining. If a decoder has latency, then the coder must also include a similar latency, so as not to violate causality. In these cases, the context modellers 904(0)-(N-1) are not operating on consecutive pixels, but pixels separated by some distance. The optional delay 906 is used to store the intermediate pixels until they are needed by the next context modeller. Where N, the number of context modellers 904, is less than the number of colors, parallel coder 900 might include a means for looping back the pixels shifted out of context modeller 904(N-1) into context modeller 904(0).

Parallel coder 900 could be implemented by a suitably-programmed digital signal processor. In such an embodiment, the operation of parallel coder 900 is similar, but different techniques might be used to optimize the performance of the parallel coder. In hardware embodiments of the parallel coder 900, there is a speed advantage to pipelining and getting data from the slowest elements in wider bandwidths. In software embodiments, the speed advantage is obtained by identifying operations that need not be done and not doing those operations. For example, in the hardware embodiment, each coder might operate on four pixels at a time to minimize the time a coder must wait for new pixel values for be retrieved, with controller 902 tracking which pixel values are needed by which coder.

FIGS. 10-12 are three examples of schemes for parallel processing pixels in an image. Each figure shows the progression of four coders over the set of pixels or an image using a different set of rules about how a coder (or more precisely, a context modeller/coder) progresses over the pixels. Each of these three figures is a grid showing which coders operate on which pixels in which clock cycles. The top of the grid shows the pixel color values for ten pixels, one per column. The pixel color values are selected integers from 0 to 15. A set of numbers of the form A:B at the intersection of a pixel column and a clock period row indicate that, during that clock cycle, coder A is checking the pixel to see if it is in color plane B. The intersections where B matches the pixel's value are shown with an "√", which indicates the point in time when the value of the pixel has been determined and not further operations on that pixel are needed. A clock cycle is not needed to code/decode color 15, since a pixel being checked for color 14 is either color 14 or color 15, all other colors having been already checked, and therefore the color must be determined after the check for color 14.

An empty intersection indicates that the pixel is not being examined by any coder and an intersection in which "idle" or "wait" is found indicates that a coder is assigned to the pixel but is not doing anything with it. As should be apparent, higher parallel coding performance is achieved by lowering the number of clock cycles a coder is idle or waiting. In each of these figures, coders are assigned to colors as indicated in Table 1. In Table 1, color 15 is not assigned to a coder since it is the last color, and as such it is not coded in color plane coding.

TABLE 1

| Coder | Colors |
|-------|--------|
| 1 | 0, 4, 8, 12 |
| 2 | 1, 5, 9, 13 |
| 3 | 2, 6, 10, 14 |
| 4 | 3, 7, 11 |

FIG. 10 results from the rules that the four coders must operate on consecutive pixels, in a pixel "window", and the coders cannot move the window to cover a new pixel until the trig pixel in the window has been coded/decoded. Only one new pixel can be accepted each clock cycle, since each new pixel must start with coding for color plane 0 and coder 0 is the only coder for color 0. As FIG. 10 shows, using these rules, 10 pixels are coded in 24 clock cycles, and the checking of a pixel might be interrupted as coder 0 moves immediately to the new pixel added to the window. Each of these schemes satisfy the requirement that, for the context of a pixel in a color plane to be available at decode time where the prior pixel affects the context, each pixel ahead of the current must be decoded at least up to the current color plane. This can be confirmed by noting that the first action for each pixel is an operation by coder 0 and each pixel to the left of a given pixel has already been decoded up to the color plane currently being applied to the given pixel.

FIG. 11 results from the rules that the window is moved to cover a new pixel when the trailing pixel is coded/decoded, but the coders are not reordered so that coder 0 can operate on the leading pixel. Instead, coding of the new pixel "waits" until coder 0 is available. This way, once checking starts on a pixel, it is operated on until it is coded. Using these rules, the 10 pixels are coded in only 21 clock cycles.

FIG. 12 results from the rules that the coders need not operate on consecutive pixels, but that only coder 0 can start on a new pixel. Using these rules, the same 10 pixels are coded in 20 clock cycles (and other pixels might be partially coded). However, because the window can be larger, these rules require more memory to store pixels in progress. The size of the window is limited by the fact that coder 0 also operates on the trailing pixels, for colors other than color 0.

In the above description, the image to be coded was separated into individual color planes. While the advantages to color plane separation is apparent from the above description, there might be situations where the added complexity of making many passes over the image need to be avoided. In these cases, a hybrid between bit plane separation and color plane separation might be used.

In one such hybrid, the image is not separated into one color plane per color, but is separated into one color group plane for each group of two colors and the color group plane is then coded as a bit plane. In another hybrid, each color group contains four colors and the color group plane is separated into two bit planes. In the example shown in FIG. 1, each pixel can have one of sixteen colors. With straight color separation, the image is separated into sixteen color planes and a coder will make up to fifteen passes over the image (the last color never needs decoding). With a hybrid color separation, the image of FIG. 1 might be separated into eight groups of two colors each, or four groups of four colors each. With eight color groups, the coder will make at most seven passes over the image to determine each pixel's color group, and then one more pass to determine the color of each pixel within it the pixel's color group, for a total of eight passes. With four colors per group, the coder makes up to three passes to determine the color group, then two passes (by bit plane) to determine the color within the group, for a total of five passes. At the other extreme, where no color separation is done, bit plane coding requires four passes over the image. While the difference between bit plane coding and color plane separation is only fifteen passes versus four passes, with more colors, the difference is greater. For example, with eight-bit color (256 values), full color plane separation takes up to 255 passes, two colors per group separation takes no more than 128 passes (127+1), four colors per group separation takes no more than 65 passes (63+2), while bit plane separation takes 8 passes. Thus, for images with larger numbers of colors, parallel coding is more often required.

In yet another variation, pixel color values are represented by vectors and each vector component is color separated independently. For example, with eight-bit pixel color values, the pixel values might be separated into two four-bit values to form a two-dimensional vector for each pixel. Each of these four-bit subcolor components are then separated into one of sixteen color planes associated with the corresponding dimension of the vector. This variation is useful for parallel decoding. This requires a maximum of thirty passes, or fifteen passes per component.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of compressing an array of pixel values, wherein the array collectively forms an image and each pixel is characterized by a color value and a location within the image, the method comprising the steps of:

separating pixels of the image into color planes, wherein a color plane is a two-dimensional array of binary values indicating whether a color value for a pixel is a color value corresponding to a color value for that color plane;

coding a first color plane;

identifying a set of remaining pixels, the set of the remaining pixels being those pixels coded in the step of coding the first color plane;

coding those pixels of the set of remaining pixels which are in a second color plane which are not found in the first color plane; and repetitively coding, for subsequent color plane, pixels which are not of a color corresponding to a previously coded color plane.

2. The method of claim 1, further comprising a step of ordering the color planes by frequency of color, a color plane with a color which is a most frequent color in the image being a first color and a color plane corresponding to the first color being the first color plane, thereby coding the color planes in frequency order.

3. The method of claim 1, where a color plane corresponding to color which is not present in the image is not coded.

4. The method of claim 1, wherein the steps of coding are steps of entropy coding.

5. The method of claim 4, wherein the steps of entropy coding are steps of coding using a high-speed binary entropy coder.

6. The method of claim 4, wherein the steps of entropy coding are steps of coding using a Q-coder.

7. The method of claim 4, wherein the steps of entropy coding are steps of coding using a B-coder.

8. The method of claim 4, wherein entropy coding is performed with a context including at least a value of one pixel near the pixel being coded.

9. The method of claim 4, wherein entropy coding is performed with a context including at least a value of a position of the pixel being coded.

10. The method of claim 4, wherein entropy coding further comprises a step of determining a context for a current pixel and the context is an indication of which neighboring pixels are in the color plane being coded.

11. A method of decompressing an array of pixel values from a compressed data set comprising the steps of:

identifying, from a priori information and previously decompressed pixel values, a current color plane for a current pixel being decoded;

determining, from previously decoded pixels in previously decoded color planes, a position within the array of the current pixel being decoded, wherein the position of the current pixel is assumed to be a position other than a position of the previously decoded pixels in the previously decoded color planes; and repetitively decoding subsequent pixels in subsequent color planes.

12. The method of claim 11 wherein the step of decoding a pixel is done according to an adaptive entropy code, where the adaptive entropy code is determined by reference to a context for the determined location for the current pixel being decoded.

13. The method of claim 11, wherein a final color plane is not decoded and pixel locations which do not contain a pixel value are assigned a pixel value for the last color plane.

14. A method of compressing an array of element values, wherein the array of element values collectively forms a data set and each element is characterized by an element value and a location within the array, the method comprising the steps of:

separating the elements into sparse arrays, wherein a sparse array contains the elements having element values equal to an array value associated with that sparse array, wherein a sparse array is an array of binary values with a one-to-one correspondence to the array of elements;

coding a first sparse array;

identifying a set of uncoded element locations corresponding to positions in the first sparse array which reference elements with element values other than the array value for the first sparse array;

coding a portion of a second sparse array, the portion coded being the bits in element locations corresponding to the element locations in the set of uncoded element locations; and repetitively coding, for subsequent sparse arrays, elements in element locations which are not element locations for elements in previously coded sparse arrays.

15. A method of decompressing an element array from a compressed data file, wherein the element array collectively forms a data set with elements each characterized by an element value and a location within the element array, the method comprising the steps of:

identifying a first range of the compressed data file, wherein the first range represents compressed information content of a first sparse array and the first sparse array is an array of binary values indicating which elements of the element array have element values equal to a first sparse array element value;

decoding the first sparse array from the first range;

identifying a second range of the compressed data file, wherein the second range represents compressed information content of a second sparse array of binary values each indicating whether an element of the element array has an element value equal to a second sparse array element value or has an element value different from the first sparse array element value and the second sparse array element value, and wherein the second range includes less than all element value information for elements found in the first sparse array;

decoding the second sparse array from the second range; and repeating the steps of identifying a range and decoding a sparse array until a threshold number of sparse arrays are decoded, wherein each subsequent sparse array identifies, for each element not yet decoded, whether the element has an element value equal to the sparse array element value.

16. The method of claim 15, further comprising the steps of decoding, using bit plane decoding, the element values for sparse arrays which have not been decoded when the threshold number of sparse arrays are decoded.

17. The method of claim 15, wherein the threshold number of sparse arrays is one less than the number of different element values, the method further comprising the step of assigning a default element value to elements not decoded in the threshold number of decodings of sparse arrays.

18. The method of claim 15, wherein each element is characterized by the element value decoded in the decoding steps and the method further comprises steps of decoding subvalues for each element using bit plane decoding after the threshold number of sparse arrays are decoded.

19. An image compressor for compressing an image to form a compressed data set, comprising:

an image storage memory for storing pixel values collectively representing the image to be compressed, wherein each pixel of the image is characterized by a pixel value and a pixel location within the image;

a pixel value reader, coupled to the image storage memory, which reads pixel values from the image storage memory and out-puts binary representations of pixels in color plane order, wherein a binary representation of a pixel in a current color plane indicates whether or not the pixel is in the current color plane, a pixel being in a color plane if and only if its pixel value is in a set of pixel values associated with the color plane;

a color plane coder, coupled to the pixel value reader, for coding yet uncoded pixels in the current color plane, the color plane coder comprising:

a context modeller which identifies, from previously coded pixels drawn from at least one of the current color plane and previously coded color planes, a context for a current pixel in a current color plane, wherein the context modeller includes a first output indicating a result of a comparison of the current pixel's pixel value and the color of the current color plane and a second output indicating the context for the current pixel; and a binary entropy encoder coupled to the context modeller, which encodes the current pixel into a bit stream output by the binary entropy encoder based on the result and the context output by the context modeller; and a bit stream collection means, coupled to the binary entropy encoder, for collecting the output of the binary entropy encoder into the compressed data set.

20. The image compressor of claim 19, wherein each set of pixel values includes only one pixel value, thereby resulting in each color plane containing pixels all having a common pixel value.

21. The image compressor of claim 19, wherein at least one set of pixel values comprises a plurality of pixel values, the image compressor further comprising a bit plane coder for coding information indicating which of the plurality of pixel values is the pixel value for pixels in color planes having sets of plural pixel values.

22. The image compressor of claim 19, wherein the context modeller provides a context based on whether or not neighboring pixels around the current pixel are in the current color plane.

23. An image decompressor for decompressing an image from a compressed data set to form an uncompressed image, wherein each pixel of the uncompressed image is characterized by a pixel value and a pixel location within the uncompressed image, the image decompressor comprising:

a compressed data set storage memory for storing the compressed data set;

a color plane decoder, for decoding pixels from the compressed data set in color plane order, the color plane decoder comprising:

a context modeller which identifies, from previously decoded pixels drawn from at least one of a current color plane and previously decoded color planes, a context for a current pixel in a current color plane being decoded, the context indicating the color planes for pixels neighboring the current pixel;

a binary entropy decoder, coupled to the context modeller and the compressed data set, which decodes the current pixel based on the context for the current pixel identified by the context modeller; and a color plane accumulator which accumulates pixels decoded by color plane by the binary entropy decoder into an image storage memory, thereby forming the uncompressed image in the image storage memory.

24. The image decompressor of claim 23, wherein the context for the current pixel is a context indicating whether or not the pixels neighboring the current pixel are in the current color plane.

25. The method of claim 1, where a color plane corresponding to one color which is present in the image is not coded.

26. The method of claim 3, where a color plane corresponding to one color which is present in the image is not coded.

* * * * *